Feb. 22, 1949.  J. M. WEISS  2,462,444
PRODUCTION OF MALEIC ANHYDRIDE FROM MALEIC ACID
Filed July 29, 1948
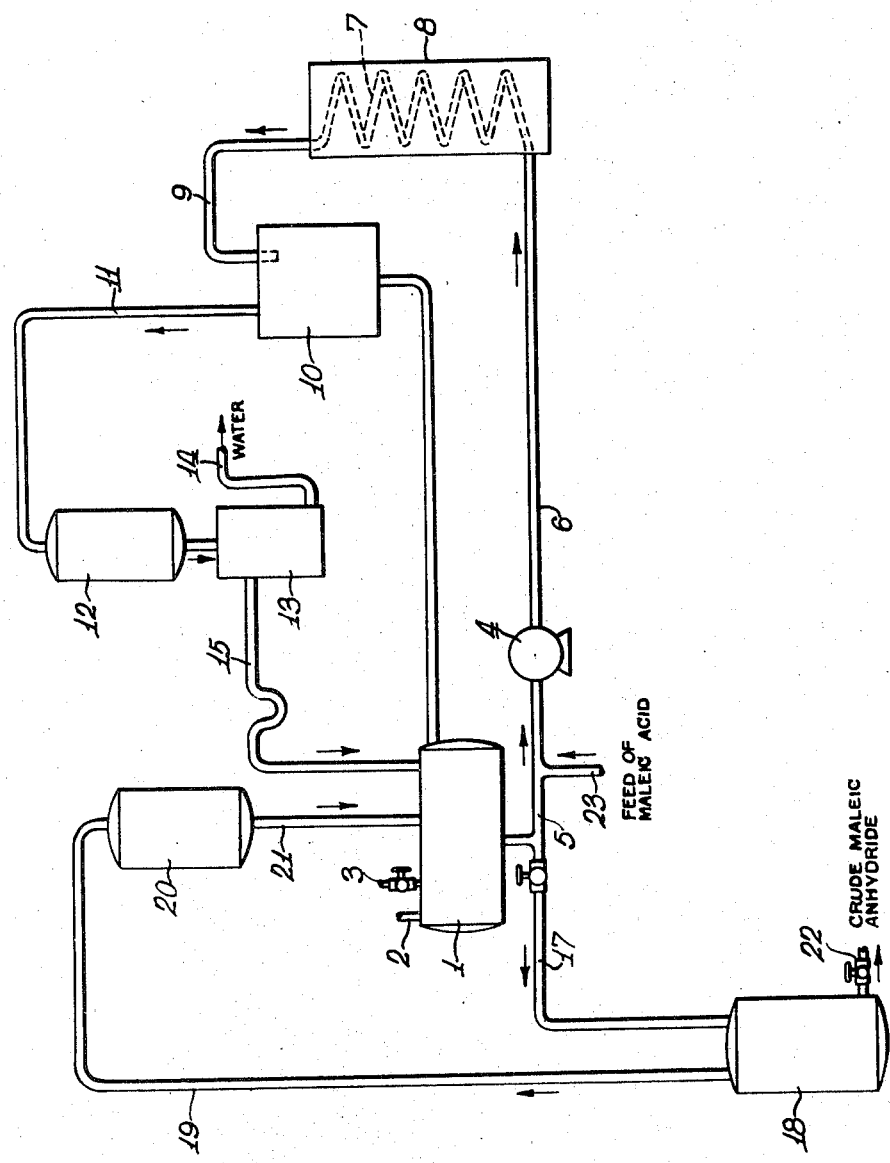
INVENTOR
*John M. Weiss*
BY
*Dean Fairbanks & Hirsch*
ATTORNEYS

UNITED STATES PATENT OFFICE 2,462,444

PRODUCTION OF MALEIC ANHYDRIDE FROM MALEIC ACID

John M. Weiss, New York, N. Y.

Application July 29, 1948, Serial No. 41,295

4 Claims. (Cl. 260—342.6)

This application is a continuation-in-part of my prior application Serial No. 607,198, filed July 26, 1945, now abandoned.

This invention is concerned with the production of maleic anhydride from maleic acid according to the reaction $C_4H_4O_4 = C_4H_2O_3 + H_2O$.

In the production of maleic anhydride by the catalytic vapor phase oxidation of benzene, butylenes or other organic substances with air, it is possible to recover a substantial part of the maleic anhydride produced, by methods of direct condensation or of solvent absorption from the reaction gases. A part however is always recovered as a water solution of maleic acid from which crystal maleic acid can be obtained. From an operating standpoint it is simpler and cheaper to absorb all of the product from the reaction gases in water and recover it as a solution of maleic acid, provided that an economic and efficient method of transforming the maleic acid to maleic anhydride is available.

If solid maleic acid is heated to its melting point (about 130° C.) and held there, some decomposition to maleic anhydride occurs, but fumaric acid (melting point about 290° C.) is formed at a much faster rate by isomerization of the maleic acid and the mass goes solid after a short time due to the formation of this product. This formation of fumaric acid must be avoided to the greatest degree possible if any process for the production of maleic anhydride from the acid is to be considered a practical one, since, once formed, fumaric acid will not revert to maleic acid, since maleic acid is the less stable form of the two special isomers of like empirical formulae.

If maleic acid is fed as a solid on a heated surface with a proper combination of rate and temperature, it will vaporize to a mixture of maleic anhydride and water. With instantaneous vaporization, only a small proportion of fumaric acid will be formed by re-arrangement before volatilization takes place. However, any deposit of fumaric acid on the heating surface acts as an insulator, thereby slowing up the vaporization so as to cause a progressive increase in the fumaric acid formation. Any commercial operation requires some means of mechanical removal of the solids deposited on the heating surface. Decomposition of maleic acid to the anhydride and water is speeded and fumaric acid formation reduced by allowing the reaction to take place in a vacuum so that the products are volatilized more readily after they are formed.

The condensation of the product presents certain problems in that the maleic anhydride and water tend to recombine. Condensation should be at a temperature high enough so that little water will condense and hence give a condensed product low in maleic acid content. It would be impractical to obtain a maleic anhydride entirely free of maleic acid for then the temperature would be such that very substantial quantities of maleic anhydride would be carried along with the water to be recovered as maleic acid to re-charge to the process. An intermediate temperature would however give an anhydride low enough in maleic acid to be withdrawn as a liquid and finally purified by distillation. The optimum temperature for such condensation would vary with the pressure (or vacuum) kept on the system.

Runs in stills provided with scraper agitators gave yields up to 70% of theory based on the charge, but the accumulation of solid fumaric acid so interfered with heat transfer that runs would only be of short duration since with continued operation the results became progressively worse.

A better procedure along these lines is disclosed in U. S. Patent 2,222,283. The patent describes the reaction chamber as of a form substantially that of a drum type rod mill encased in a flue so that it can be heated externally by hot gases of combustion. The drum is stated to rotate at around 50 R. P. M. The trunnions on which the mill rotates are hollow, one serving to admit solid maleic acid propelled by a screw conveyor and the other serving for the exit of the mixed vapors of maleic anhydride and water. The patent states that the combustion gases around the drum are regulated to a temperature of around 375° to 400° C., a vacuum of 150 to 155 mm. absolute pressure being maintained on the drum and the maleic acid being fed at such a rate as to maintain the vapors exiting from the drum at a temperature of from 200 to 240° C.

The vapors first pass down through a vertical chamber kept at a temperature of about 145° C. where dust and fumaric acid are supposed to settle out. Such separated material is removed from the wall of the separator chamber by means of a scraper mechanism which drops it to the bottom of the chamber so it can be removed. From the separator chamber the gases pass through a dust filter and thence to a condensing chamber held at 70° C. by means of a constant boiling liquid bath. Here about 94% of the maleic anhydride entering the condenser is stated to separate as a material containing about 98% anhydride and 2% acid. Finally, the vapors pass to a second water cooled condenser and finally to a water scrubber where the residual maleic acid is recovered as a water solution which is re-worked for its maleic acid content.

The fumaric acid formation, as judged from some statements made in the patent, is of the order of 1.5% and the actual recovery of anhydride according to the best claims appears to be of the order of 92 and 93% of the charge.

Such processes however require quite expensive distillation and condensation equipment and very close control, as discussed earlier, and any failure in control results either in fumaric acid formation in the distillation portion or reformation of maleic acid in the condenser.

A method along entirely different lines involves mixing solid maleic acid with coal tar xylene (boiling from about 137° C. to 141° C.), keeping the solid acid in suspension by agitation in a vessel or still, and heating to boiling under a reflux condenser. The condensate of water and xylol passes through a separator to remove water and the separated xylol returns to the boiling mass. The reflux boiling is continued until evolution of water ceases. The residue in the still then consists of a strong solution of maleic anhydride in xylol with some suspended fumaric acid. A simple fractional distillation suffices to separate xylol to be returned for re-use and to produce distilled finished maleic anhydride of high purity.

Using such a process in stills of moderate size so that the decomposing operation can be finished in less than two hours, yields of about 90% of the maleic acid have been obtained as maleic anhydride with the balance as fumaric acid. The difficulties with reformation of maleic acid are substantially eliminated. However, when increasing to large size units, it is difficult to design the proper type of heating surfaces in ample amount together with the other accessories necessary to complete the decomposition within a space of time, say, below two hours, during which fumaric acid can be held to a reasonable minimum.

My invention comprises a cyclic system where the time factor of decomposition can be held readily at 15 minutes or less, or even at a fraction of a minute, thereby almost eliminating fumaric acid formation. A cycle is set up where a strong solution of maleic anhydride in xylene or other equivalent solvent having a boiling point between 130° C. and 160° C. is circulated successively through a heating means, a vapor release chamber, and back to the heating means. Prior to the entrance to the heating means, maleic acid, either solid or in a strong aqueous solution, is fed into the circulating stream at a regulated rate. Vapors from the vapor release chamber are condensed, water separated from the condensate, and the xylene return to the circulating stream. A bleed of the circulating stream is taken off at a suitable point and distilled either in batch or continuously to remove the xylene, which is returned to the process, the bottoms comprising the make of crude maleic anhydride being withdrawn for use or further treatment.

I have mentioned above xylene or other equivalent solvent. The preferred solvent is a pure xylene or mixture of pure xylenes which is quite close boiling. However, I can also use commercial refined aromatic hydrocarbon fractions having a boiling point between about 130° C. and about 160° C., and which in addition to xylenes contain some toluene and/or some higher boiling aromatics such as trimethyl or ethyl methyl benzenes which tend to widen the boiling range.

The process will be described in connection with the accompanying figure which is diagrammatic in nature, and not intended to limit the scope of the invention.

A tank or reservoir 1 contains a solution of maleic anhydride in xylene. A practical operation ratio may be anywhere between 20 and 70% of maleic anhydride by weight, but this proportion is not a critical feature. A vent 2 and a valved fill line 3 are provided on the tank, the latter for the purpose of introducing make up xylene as required. Solution is drawn off at the bottom of the tank 1 by the pump 4 through the line 5, through the line 6, to a coil 7 or equivalent in the heater 8. This heater may consist of a furnace heated by oil, gas or other fuel or may be arranged so that the coil is heated directly by pressure steam, Dowtherm vapor, etc. In the latter cases, a conventional heat exchanger of any desired type such as tube and shell may replace the coil 7 and heater 8. The particular type of heating means used is not an essential feature of the invention. The heated solution emerges by the transfer line 9 and goes to a vapor release chamber 10 which may be held at atmospheric pressure, moderate superatmospheric pressure, or under vacuum. Vapors pass by the pipe 11 to a condenser 12. These vapors consisting of water, xylene and a little maleic anhydride, are condensed and flow to a conventional separator 13, where an aqueous layer separates and flows out the pipe 14 either to waste or for reworking for its maleic acid content. Xylene containing a small amount of maleic anhydride returns through the trapped pipe 15 to the tank 1. Arrows on the figure indicate the direction of flow.

The liquid residue from the vapor release box flows through the pipe 16 and is returned to tank 1. For simplicity the balancing devices, valves, etc. needed for vacuum or pressure operation are not shown. These are all common engineering expedients and not essential elements of the invention.

Maleic acid is fed to the circulating solution by the inlet 23 to the pipe 5. If solid acid is fed, a screw feed or equivalent device is necessary, while with a strong water solution, a pump may be used. The feed need not be prior to the pump in line 5 but may be subsequent to it in line 6.

A suitable proportion of the circulating solution is drawn off from any convenient point of the cycle subsequent to the heater and prior to the maleic acid feed, for example, by the valved pipe 17, either continuously or intermittently to a batch or continuous still 18 which is heated by steam or other convenient means. Vapors of xylene plus some maleic anhydride pass off through the pipe 19 to the condenser 20, and the condensate returns to the tank 1 by the pipe 21. The produced crude maleic anhydride is withdrawn by the pipe 22. If desired, a column or other fractioning device may be arranged between the still 18 and the condenser 20 to minimize the carryover of maleic anhydride, or the still 18, if continuous in operation, may be of the column type of conventional design.

Depending on the concentration and temperature of the liquids at different parts of the process, a steam heating may be required to prevent solidification. All equipment in contact with maleic anhydride or solutions thereof, and especially water solutions of maleic acid, must be constructed from corrosion resisting material such as No. 316 stainless steel.

An advantageous method of operation is to hold the circulating solution at a strength of between 40 and 70% maleic anhydride, add from 3 to 5% maleic acid as solid or strong (50-70%) solution to the circulating xylene solution, and heat in the coil 7 or its equivalent to 160° to 240° C., with a rapidity of circulation so that the time in the heating zone is held to a period of not more than 15 minutes, and preferably within the range of 30 seconds to 2 minutes. The solution should be under sufficient pressure in the coil to prevent vaporization therein, a valve being placed in the transfer line 9 near the vapor release chamber 10 to maintain the necessary pressure if the back pressure of the heater is insufficient. The temperature of heating, the rate of feed of maleic acid, the speed of circulation of the solution, and the pressure on the vapor release chamber are correlated so that substantially all maleic acid fed is decomposed and substantially all water vaporized in the vapor release box. Under such circumstances the formation of fumaric acid may be expected to be substantially less than 1% of the maleic acid fed and of the order of 0.01 to 0.2%. With suitable velocities the bulk of this fumaric acid is deposited in the vapor release chamber which can be cleaned from time to time to remove it.

Overall, some 99 to 99.8% of the maleic acid fed can be recovered in the form of a crude maleic anhydride.

From time to time, as necessary, additional xylene to make up losses is introduced through the line 3. Other solvents than xylene may be used but they must boil at a lower temperature than maleic anhydride so as to be separable therefrom.

The use of water solutions would be impossible with the flash distillation of Patent 2,222,283, since the excess of water vapor would cause too much reversion during condensation. In my process, within reasonable limits, the excess water can be tolerated at the cost of extra heat for the vaporization of the solvent required to carry it overhead.

In the appended claims, the term maleic acid is intended to include the solid acid or strong aqueous solutions thereof.

Having thus described my invention what I claim as new and desire to secure by Letters Patent is:

1. The process of producing maleic anhydride from maleic acid and which includes circulating in a closed cycle a solution composed essentially of a solvent comprising an aromatic hydrocarbon liquid having a boiling point between about 130° C. and about 160° C., and 20% to 70% maleic anhydride, adding maleic acid to said solution at one point in the cycle, heating said solution and added maleic acid in another portion of the cycle to a temperature of 160° C. to 240° C. for a period of not more than 15 minutes to convert substantially all of the maleic acid present to maleic anhydride and water, and to form vapors of water and a portion of the solvent, discharging said vapors from the cycle, condensing said vapors, separating water from the condensed solvent and discharging the water from the system, returning said solvent to the cycle, withdrawing a portion of said solution from the cycle at a point beyond the point of vapor discharge and prior to the introduction of fresh maleic acid, distilling said last mentioned portion of the solution to vaporize solvent and leave maleic anhydride as residue, condensing the solvent vapors, and returning the condensate to the cycle.

2. Process according to claim 1, where the time in the heating zone is held within the range of 30 seconds to 2 minutes.

3. The process as defined in claim 1, and in which the residue is removed and purified.

4. The process of producing maleic anhydride from maleic acid and which includes circulating in a closed cycle a solution composed essentially of a solvent comprising an aromatic hydrocarbon liquid having a boiling point between 130° C. and about 160° C., and 20% to 70% maleic anhydride, adding maleic acid to said solution at one point in the cycle, heating said solution and added maleic acid in another portion of the cycle to a temperature of 160° C. to 240° C. for a period of less than 2 minutes to convert substantially all of the maleic acid present to maleic anhydride and water, and to form vapors of water and a portion of the solvent, discharging said vapors from the cycle, withdrawing a portion of said solution from the cycle at a point beyond the point of vapor discharge and prior to the introduction of fresh maleic acid, and distilling said last mentioned portion of the solution to vaporize solvent and leave maleic anhydride as residue.

JOHN M. WEISS.

REFERENCES CITED

The following references are of record in the file of this patent:

UNITED STATES PATENTS

| Number | Name | Date |
| --- | --- | --- |
| 1,424,138 | Bailey et al. | July 25, 1922 |
| 2,166,556 | Spence et al. | July 18, 1939 |
| 2,222,283 | Crowell | Nov. 19, 1940 |
| 2,250,091 | Campbell et al. | July 22, 1941 |
| 2,340,490 | Porter | Feb. 1, 1944 |